US010445525B2

(12) United States Patent
Lovin

(10) Patent No.: US 10,445,525 B2
(45) Date of Patent: *Oct. 15, 2019

(54) DATA PRIVACY MANAGEMENT SYSTEM AND METHOD

(71) Applicant: MICROSOFT TECHNOLOGY LICENSING, LLC, Redmond, WA (US)

(72) Inventor: Paul Lovin, Munich (DE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/949,994

(22) Filed: Apr. 10, 2018

(65) Prior Publication Data

US 2018/0232535 A1    Aug. 16, 2018

Related U.S. Application Data

(63) Continuation of application No. 15/055,106, filed on Feb. 26, 2016, now Pat. No. 9,946,897.

(51) Int. Cl.
*G06F 21/62* (2013.01)
*G06F 16/00* (2019.01)
*G06Q 10/00* (2012.01)

(52) U.S. Cl.
CPC .......... *G06F 21/6245* (2013.01); *G06F 16/00* (2019.01); *G06Q 10/00* (2013.01)

(58) Field of Classification Search
CPC ...... G06F 21/6245; G06F 16/00; G06Q 10/00

USPC ........................................................ 726/28
See application file for complete search history.

(56) References Cited

U.S. PATENT DOCUMENTS

| 2007/0282840 | A1* | 12/2007 | Stienhans | G06F 21/6209 |
| 2009/0198509 | A1* | 8/2009 | Dumoff | G06Q 10/063112 |
| | | | | 705/2 |
| 2010/0179883 | A1* | 7/2010 | Devolites | G06F 16/1824 |
| | | | | 705/26.1 |
| 2015/0373096 | A1* | 12/2015 | Chandrasekaran | H04W 4/023 |
| | | | | 709/226 |
| 2016/0182588 | A1* | 6/2016 | Luo | G06F 16/284 |
| | | | | 709/219 |

* cited by examiner

*Primary Examiner* — Michael S McNally
(74) *Attorney, Agent, or Firm* — Shook, Hardy & Bacon, L.L.P.

(57) ABSTRACT

Aspects of the technology described herein can provide data privacy management. An exemplary computing device may have a tracker to track various user data of a user distributed among different service providers based on metadata associated with the user data. When a transaction manager of the exemplary computing device receives a request for a first service provider to access the user data of the user, the transaction manager may request a second service provider having the user data to provide the user data to the first service provider if the user approves the first service provider to access the user data.

20 Claims, 8 Drawing Sheets

DATA PRIVACY MANAGEMENT SYSTEM AND METHOD

CROSS-REFERENCE TO RELATED APPLICATIONS

This application is a continuation of and claims priority from U.S. application Ser. No. 15/055,106, filed Feb. 26, 2016, entitled "Data Privacy Management System and Method," which is assigned or under obligation of assignment to the same entity as this application, the entire contents of each application being herein incorporated by reference.

BACKGROUND

Data privacy is an important issue for online users. Users often have to reveal their personal or sensitive information, such as names, addresses, emails, credit card numbers, login information, etc., to various online service providers when they participate in various online activities, such as online banking, online shopping, or even simply logging in to a social networking website. A user's personal information, once provided to a service provider, then may be used for purposes different from the original intention of the user for revealing that information. By way of example, the advertising industry is particularly keen to use personal information for targeted marketing. In view of the increasing concerns of data privacy, various privacy laws in many countries have emerged to prevent such personal information from misuse and may require whoever collects personal information to respect certain rights of the user.

However, online users generally lack the ability to control the personal information that they have exposed over the Internet. As an example, over time, a user can easily lose track of what personal information the user has provided to which service provider. Further, users lack an effective means to recall their personal information from a service provider, or in general, to manage their personal information distributed among various service providers. Further still, users are often required to repeatedly input the same personal information for new service providers, which can be tedious and error-prone for data entry, especially with small mobile computing devices, and risks exposing the user's sensitive information to abuse.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various aspects, systems, methods, and computer-readable storage devices are provided to improve a computing device's ability to manage data privacy for online users. One aspect of the technology described herein is to improve the computing device's ability for building and maintaining a data distribution structure to track the whereabouts of various user data of a user. Another aspect of the technology described herein is to improve the computing device's ability to direct one service provider to furnish another service provider with requisite user data upon the user's explicit or implicit consent. Yet another aspect of the technology described herein is to improve the computing device's ability to facilitate the user to manage his or her data distributed over various service providers, e.g., to manually purge some user data from a service provider.

BRIEF DESCRIPTION OF THE DRAWINGS

The technology described herein is illustrated by way of example and not limitation in the accompanying figures in which like reference numerals indicate similar elements and in which.

DETAILED DESCRIPTION

Figure 1:
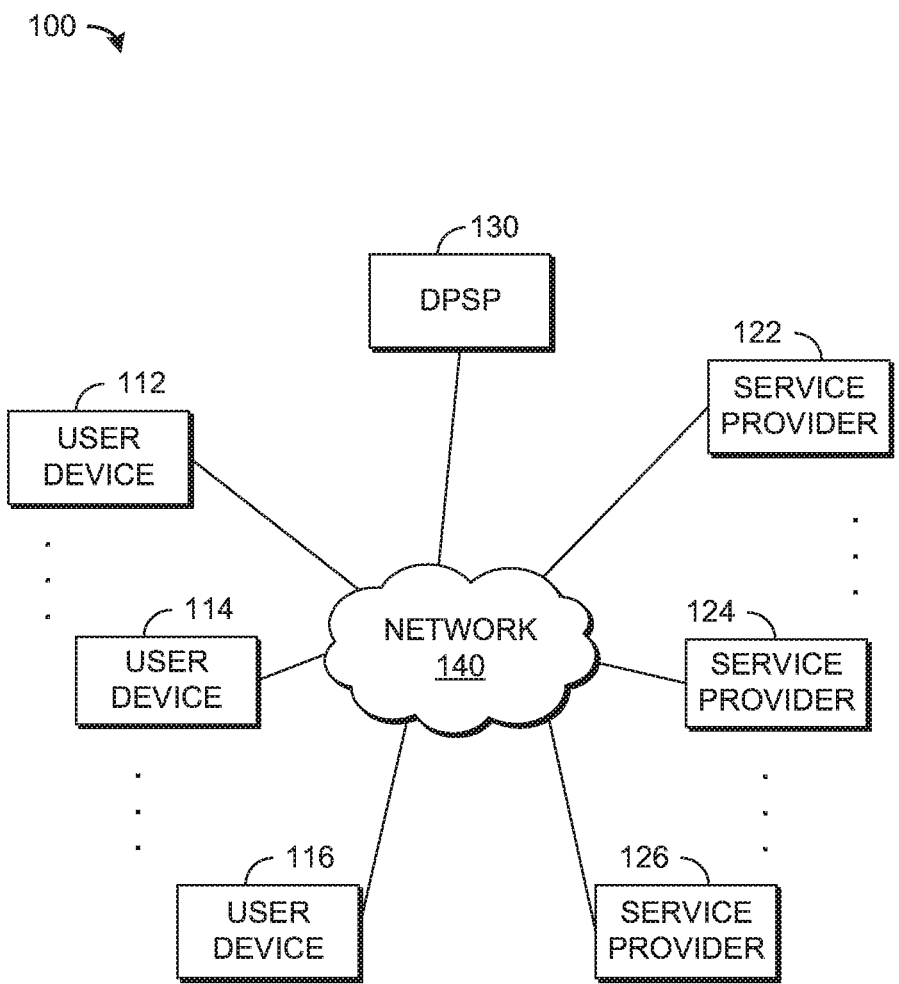
FIG. 1 is a block diagram of an example operating environment suitable for implementations of the present disclosure.

The various technologies described herein are set forth with sufficient specificity to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Data privacy (or information privacy) is related to collection and dissemination of data from a wide range of sources, particularly records with personal information, such as medical information, biological information, financial information, geolocation information, or any personally identifiable information. In this digital era, data can be easily collected and disseminated. Improper handling of personal information can be a cause for many privacy issues.

One challenge in data privacy is to share data while protecting personal information, e.g., preventing personal information from being mishandled or misused. As we are continuously moving our economy to online, users are often required to provide their personal information to each and every different service provider, which can be tedious and error-prone for the data entry process. As used herein, service providers refer to any online entities that collect, store, or use personal data of a user in order to provide various services to the user. By way of example, a service provider will likely require a new user to create a new account and populate that account with personal information, regardless of whether the same user has previously submitted the same information to any other service providers. Subsequently, users are often challenged to remember the details of how their personal information are provided to and kept by various service providers. Needless to say, users often lack any means to manage their personal information distributed among various service providers. In short, online users have rarely been offered the ability to control and manage their personal information online.

Empowering users with the ability to control the personal information they reveal online and manage such personal information exposed over the Internet thereafter is often an important step to protect their personal information. Aspects of the technology described herein include establishing a data privacy service provider (DPSP) that acts as a managed bridge among different data keepers for a user.

A service provider may own a specific dataset about a user. The service provider can inform the DPSP of what kind of data of the user are kept there. In one embodiment, only the metadata of the specific dataset of the user are communicated from the service provider to the DPSP. As an example, the service provider may indicate that it has the Mailing Address of the user without revealing the actual mailing address. Therefore, the DPSP may be exonerated from the burden to handle any actual personal information of the user. Similarly, other service providers (or data keepers) can exchange their knowledge of a user's personal information with the DPSP. Therefore, the DPSP may gain the knowledge of how the personal information is distributed and kept at various service providers.

Another aspect of the technology described herein is related to the DPSP's ability to direct one service provider to furnish another service provider with requisite user data upon the user's explicit or implicit consent. In various embodiments, a service provider knows only the personal data that the user has provided to the service provider, but the DPSP knows the whereabouts of the rest of the personal data of the user if the user has provided them to other service providers. In this case, when needed, the service provider may request any additional personal data of the user from the DPSP. In turn, the DPSP may request the user to decide whether to allow such access for the service provider. In some embodiments, the user may make such decision depending on each transaction, e.g., after reviewing the specific details of such personal data access request. In other embodiments, the user may provide a policy or directive to the DPSP, e.g., to allow all her affiliated financial institutions to access her basic profile information.

An exemplary DPSP may have a tracker to track various user data of a user distributed among different service providers based on metadata associated with the user data. When a transaction manager in the DPSP receives a request for a first service provider to access the user data of the user, the transaction manager may request a second service provider having the user data to provide the user data to the first service provider if the user approves the first service provider to access the user data. Specifically, in one embodiment, after the personal data access request is authorized by the user, the DPSP can issue a forward order to one or more entities that have the requested personal data to forward such data to the requesting service provider.

In this way, the user is no longer required to reenter the data directly to the requesting service provider, but the user is still able to control the online dataflow of her personal data. Meanwhile, the DPSP can avoid becoming the centralized location to store all personal data for the user, which otherwise could lead to additional security concerns of data hacking. In order to be benefited from the DPSP, a user may set up an account with the DPSP. Further, the DPSP will also establish an operational framework with various service providers. In some embodiments, the DPSP can be set up in a standalone computing device, e.g., a server. In other embodiments, the DPSP may be integrated into an existing cloud platform, e.g., Azure®.

Another aspect of the technology described herein is related to improving a computing device's ability for building and maintaining a tracking mechanism to track the whereabouts of user data. In various embodiments, a DPSP may implement such tracking mechanism using data structures, files, inverted indexes, etc. Logically, such tracking mechanism is to be described as a data distribution map hereinafter to map the relationship between metadata describing personal data of a user and various data keepers. By way of example, a data distribution map may show a connection between the metadata of "Credit Card Number" and the service provider for a user, which indicates a copy of the "Credit Card Number" of the user is kept by the service provider.

In some embodiments, a sheet of the data distribution map may enumerate all data keepers related to a particular metadata for a user, e.g., in a linked list, an array, or similar. In some embodiments, a sheet of the data distribution map may only list one data keeper related to the particular metadata for the user, e.g., when properties associated with the particular metadata (e.g., expiration date and time of such data) varies among different data keepers.

When a DPSP learns about the fact that an item of user data of the user is kept by a particular service provider, the DPSP may create a new entry or otherwise update an existing relevant entry in the data distribution map. In some embodiments, a new entry in the data distribution map may be manifested as a new connection between metadata of the item and the particular service provider. As an example, after confirming that one service provider received the forwarded personal data of "Age" of the user from another service provider, the DPSP may update the data distribution map to include a new connection between the service provider who received the data and the metadata of "Age" for the user. Thereafter, the service provider that received the data will be recognized as another data keeper associated with the metadata of "Age" for the user.

Yet another aspect of the technology described herein is related to the DPSP's ability to facilitate a user to manage his or her personal information distributed over various service providers, e.g., to manually purge some user data from a service provider. It is a valid concern for users whether their personally identifiable information kept in various service providers could be misused. Therefore, it is beneficial for users to monitor the whereabouts of their personal data online, further to change how their personal data are kept by various service providers.

In some embodiments, users may query the DPSP of the whereabouts of their personal data. In response to such inquires, the DPSP may send data distribution information to users, so that users may review the distribution information of their personal data among various service providers. In some embodiments, a user may decide to change how their personal data are kept by a service provider or even completely purge their personal data from the service provider. In this case, the user may send a request to the DPSP to alter a property in the data distribution map, such as to purge a selected item from a service provider or reset the expiration date of an item stored in the service provider. Subsequently, the DPSP may demand the service provider to perform an action corresponding to the user's request. Once the service provider performed the requisite action, the DPSP can update the data distribution map for the user to reflect such change.

Advantageously, various technical solutions disclosed herein for data privacy management offer users the transparency of the whereabouts of their personal data. Moreover, users can also review various properties related to how their personal data are kept by a service provider. Accordingly, users may control where and how their person data are distributed among various service providers. Further, various technical solutions disclosed herein for data privacy management enable the exchange of personal data among various service providers without repetitive data entry by users, meanwhile enabling users to supervise such personal data exchange among service providers. Such supervised personal data exchange can improve data accuracy and reduce overhead in data cleansing over inconsistent personal data. Additionally, various technical solutions disclosed herein may also strengthen the integrity of trusted computing by enabling the DPSP to serve as a trusted broker between various service providers and users.

Having briefly described an overview of aspects of the technology described herein, an exemplary operating environment in which aspects of the technology described herein may be implemented is described below. Referring to the figures in general and initially to FIG. 1 in particular, an exemplary operating environment for implementing technology described herein is shown and designated generally as exemplary operating environment 100. The exemplary operating environment 100 is one example of a suitable computing environment and is not intended to suggest any limitation as to the scope of use or functionality of aspects of the technology described herein. Neither should the exemplary operating environment 100 be interpreted as having any dependency or requirement relating to any one component nor any combination of components illustrated.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 112 and 114 through 116; a number of service providers, such as service providers 122 and 124 through 126; DPSP 130; and network 140. It should be understood that operating environment 100 shown in FIG. 1 is an example of one suitable operating environment. Each of the components shown in FIG. 1 may be implemented via any type of computing device, such as computing device 800 described in connection to FIG. 8, for example. These components may communicate with each other via network 140, which may include, without limitation, one or more local area networks (LANs) and/or wide area networks (WANs). In exemplary implementations, network 140 comprises the Internet and/or a cellular network, amongst any of a variety of possible public and/or private networks.

In some embodiments, user devices 112 and 114 through 116 can be client devices on the client-side of operating environment 100, while DPSP 130 can be on the server-side of operating environment 100. In some embodiments, service providers 122 and 124 through 126 as well as DPSP 130 may be implemented as services in a computing cloud, like Azure®. In some embodiments, DPSP 130 may be integrated as an agent into user devices. This division of operating environment 100 is provided to illustrate one example of a suitable environment, and there is no requirement for each implementation that DPSP 130, a user device, and a service provider remain as separate entities.

A user device can facilitate a user to manage data privacy. By way of example, user device 112 may enable the user to communicate with service provider 122, such as to submit user data to service provider 122 in order to receive the service provided by service provider 122. As another example, user device 114 may enable the user to communicate with DPSP 130, such as to review how the user's personal data are distributed among various service providers or to modify the user's personal data stored by a service provider. As yet another example, user device 116 may enable the user to approve one service provider to receive personal data forwarded by another service provider, such as to approve service provider 124 to receive the user's payment information from service provider 126 without re-entering the same payment information again.

User devices 112 and 114 through 116 may comprise any type of computing device capable of use by a user. For example, in one aspect, user devices 112 through 116 may be the type of computing device described in relation to FIG. 8 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

In some embodiments, a user device may have a browser, a plug-in to a browser, or a specially designed application installed on the user device to implement one or more aspects of the technical solutions discussed herein for data privacy management. In such cases, the user device may be associated with a user account or a user identification. Therefore, user device 112, 114, or 116 may independently provide functions related to data privacy management for a user whenever the user account or the user identification attaches to the selected user device.

Service providers 122 and 124 through 126 may comprise necessary hardware and/or software to provide at least a type of service to online users. By way of example, service providers may provide Internet access, communication services (VoIP, email, messaging, etc.), news, entertainment (music, movies, etc.), online search, e-commerce, e-finance, e-banking, e-health, e-government, etc. Service providers 122 and 124 through 126 may be discrete from user devices 112 and 114 through 116 and DPSP 130 or may be incorporated and/or integrated into at least one of those components.

In some embodiments, a service provider may register with DPSP 130 to enable users to manage data privacy via DPSP 130. Subsequently, service provider 122 may report to DPSP 130 all personal data of a user stored in service provider 122. As an example, service provider 124 may request access to some personal data of the user via DPSP 130. As another example, service provider 126 may forward the requested personal data of the user to service provider 124 upon the user's approval. As yet another example, service provider 126 may delete or modify an item of personal data of the user upon the user's request via DPSP 130.

DPSP 130 can comprise server-side software designed to work in conjunction with client-side software on user devices 112 and 114 through 116 so as to implement any combination of the features and functionalities discussed in the present disclosure. In various embodiments, DPSP 130 acts as a managed bridge among different service providers for a user and enables the user to control whether a service provide can access the user's personal data. Further, DPSP 130 can facilitate the user to manage such personal data distributed among various service providers.

DPSP 130 builds and maintains a tracking mechanism to track the whereabouts of user data. The tracking mechanism may use any suitable data structure, such as a linear data structure (e.g., arrays, lists, etc.), trees (e.g., binary trees, B-trees, heaps, etc.), hashes, graphs, etc. The tracking mechanism may be implemented in any suitable database models, such as a relational model, object model, document model, star schema, etc. The tracking mechanism may be captured in a database management system, such as Microsoft Access®, Microsoft SQL®, etc. As discussed herein, the tracking mechanism is logically described as a data distribution map to connect metadata describing personal data of a user and various data keepers (e.g., service providers who store the personal data of the user).

DPSP 130 can direct one service provider to furnish another service provider with personal data of a user based on the user's explicit or implicit approval. DPSP 130 knows the whereabouts of the personal data of the user, e.g., based on the data distribution map. By way of example, when service provider 122 requests access to an item of personal data of the user (e.g., date of birth), which service provider 122 does not have, DPSP 130 is aware of the fact that both service provider 124 and service provider 126 have the item, e.g., the data distribution map shows a connection between the metadata of "Date of Birth" and service provider 124 as well as service provider 126. Thereafter, DPSP 130 may request the approval from the user (e.g., via user device 112) for service provider 122 to access the user's "Date of Birth." If the user issues an approval, DPSP 130 may then request service provider 124 and/or service provider 126 to forward the user's data related to "Date of Birth" to service provider 122. Further, after service provider 122 confirms the receipt of such data, DPSP 130 updates the data distribution map to include a new connection between the metadata of "Date of Birth" and service provider 122.

Figure 2:
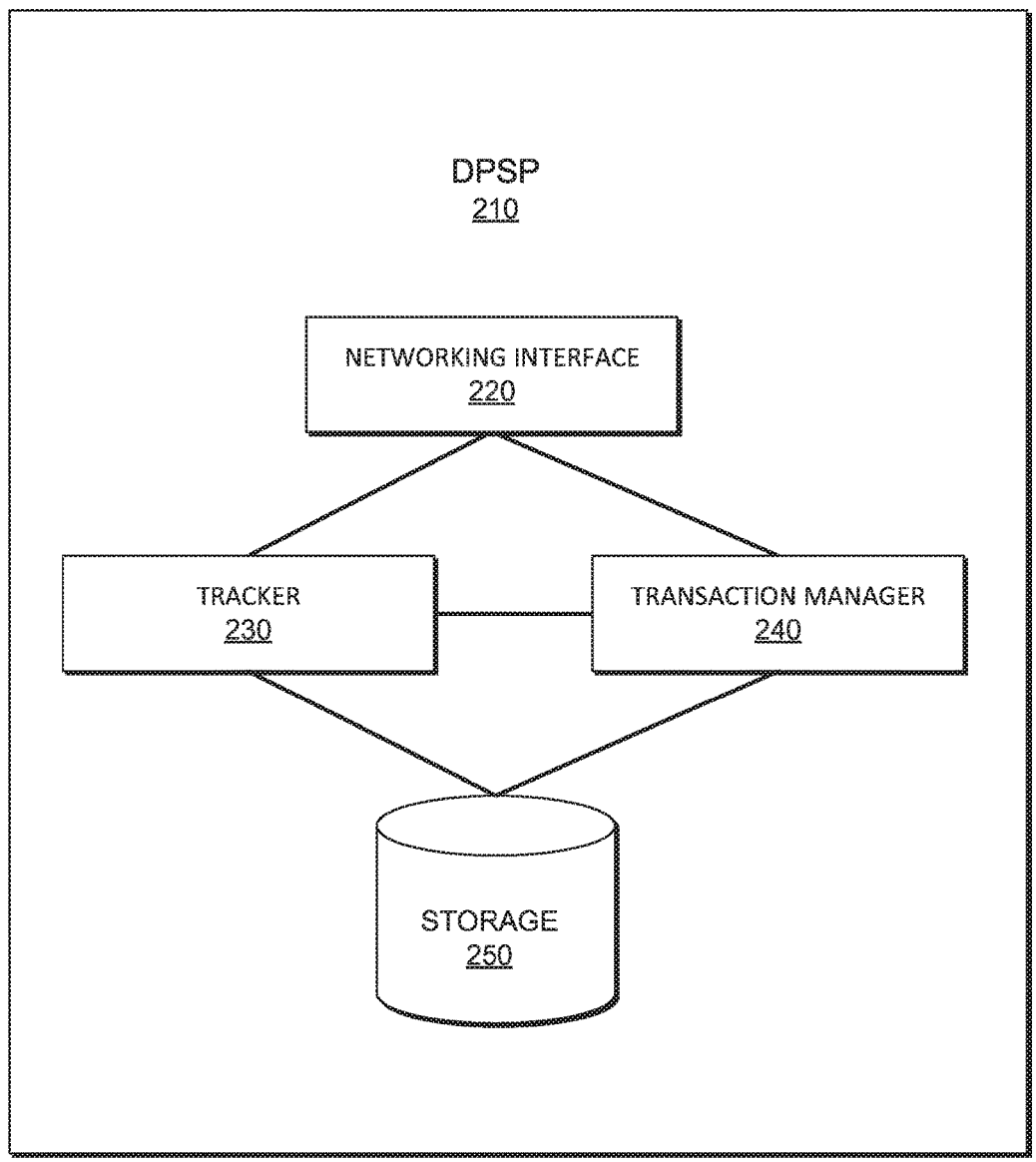
FIG. 2 is a block diagram depicting an example computing architecture suitable for implementing aspects of the present disclosure.

DPSP 130 can be utilized to implement one or more of the components of system 200, described in FIG. 2, including components for implementing data privacy management functions.

Referring now to FIG. 2, a block diagram is provided showing aspects of an example computing system architecture suitable for implementing an embodiment and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

An exemplary DPSP may have a tracker to track various user data of a user distributed among different service providers based on metadata associated with the user data. When a transaction manager in the DPSP receives a request for a first service provider to access the user data of the user, the transaction manager may request a second service provider having the user data to provide the user data to the first service provider if the user approves the first service provider to access the user data. Specifically, in one embodiment, after the personal data access request is authorized by the user, the DPSP can issue a forward order to one or more entities that have the requested personal data to forward such data to the requesting service provider.

Example system 200 includes networking interface 220, which is described in connection to FIG. 1, and which communicatively couples any one of components of system 200, including tracker 230, transaction manager 240, and storage 250 with other computer devices, such as user devices or service providers depicted in FIG. 1. Networking interface 220 provides an interface for system 200 to communicate over one or more network(s) and/or with any other suitable device. In various embodiments, networking interface 220 may include any suitable hardware and/or firmware, such as a network adapter, one or more antennas, wireless interface(s), and so forth. Further, networking interface 220 may interoperate with radio communications technologies such as, for example, Wideband Code Division Multiple Access (WCDMA), Global System for Mobile communications (GSM), Long Term Evolution (LTE), WiFi, Bluetooth®, Zigbee, and the like.

In various embodiments, tracker 230 and transaction manager 240 may be embodied as a set of compiled computer instructions or functions, program modules, computer software services, or an arrangement of processes carried out on one or more computer systems, such as computing device 800 described in connection to FIG. 8, for example.

In one embodiment, the functions performed by components of system 200 are associated with one or more applications, services, or routines. In particular, such applications, services, or routines may operate, at least partially, on one or more user devices (e.g., user device 112), servers (e.g., DPSP 130) and one or more service providers (e.g., service provider 122), may be distributed across one or more computing devices, or may be implemented in a computing cloud (e.g., Azure®).

Moreover, these components, functions performed by these components, or services carried out by these components in system 200 may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, tracker 230 is generally responsible for tracking user data at one or more service providers, such as service providers 122 and 124 through 126 of FIG. 1. In various embodiments, tracker 230 is to track user data distribution based on metadata associated with the user data. By way of example, in a data distribution map, tracker 230 is to associate metadata of an item of the user data with a service provider if the service provider has that item of the user data. Therefore, the data distribution map, e.g., stored at storage 250, may facilitate tracker 230 to track the whereabouts of every user data item associated with a user. Storage 250 may include a file, an inverted index, a database, or any suitable data storage structure. The exemplary data that may be stored in storage 250 are further illustrated in connection with FIG. 3 below.

Further, tracker 230 builds the data distribution map between respective metadata of various user data and various service providers. In building the data distribution map at storage 250, tracker 230 may also need to identify various metadata associated with the user data. By way of example, when encountering a new item of the user data, tracker 230 may need to consolidate different nomenclatures. As an example, tracker 230 may equate "Family Name" to "Last Name" based on a taxonomy database on personal data or an ontology related to personal data for making such inference. As another example, tracker 230 may need to identify related metadata for a new item of the user data, e.g., when the new item is simply located in unstructured text. In this case, tracker 230 may resort to semantic reasoners (e.g., based on ontologies), logic reasoning (e.g., based on rule engines), or other suitable tools to understand the semantics of the new item, and automatically discover suitable metadata to be associated with the new item of the user data.

Transaction manager 240 manages various transactions related to user data, particularly personal data. In some embodiments, transaction manager 240 receives, via networking interface 220, a request for a first service provider to access an item of user data of a user. Subsequently, transaction manager 240 may request a second service provider having the requested item to forward the item to the first service provider upon the user's approval. Specifically, in one embodiment, after the personal data access request is authorized by the user for the first service provider to access the requested item, transaction manager 240 can issue a data forward order to the second service provider to forward such data to the first service provider.

To identify which service provider has the requested item, transaction manager 240 may resort to tracker 230 or the data distribution map maintained by tracker 230. For example, transaction manager 240 or tracker 230 may identify the second service provider having the requested item based on a connection in the data distribution map between the metadata of the requested item and the second service provider. Further, once the first service provider confirms to transaction manager 240 of its receipt of the item from the second service provider, tracker 230 updates the data distribution map to include a new connection between the first service provider and the metadata of the item.

In this way, the user is no longer required to reenter the data directly to the first service provider. Nonetheless, the user is still in control of the online dataflow of her personal data during the data access authorization process. Further, the user may also specify additional parameters in the authorization. As an example, transaction manager 240 may set up an indication of permission or an indication of prohibition for the first service provider to store the item after an approved access period based on the additional parameters in the authorization set by the user. If the user wants to prohibit the first service provider from storing the user's personal data after the initial access period, e.g., the necessary time needed for the user to receive a particular service from the first service provider, then the user may indicate so in his or her authorization message to transaction manager 240. Subsequently, transaction manager 240 may send an indication of prohibition for storing the item to the first service provider. In another embodiment, transaction manager 240 may also allow the user to set up certain rules in DPSP 210, such as a rule to always prohibit the recipient of the user's personal data from storing it locally in additional service providers, so that the user may keep her personal data only in trusted sources.

In various embodiments, DPSP 210 can avoid storing any personal data for the user, which otherwise could lead to additional security concerns of data hacking at DPSP 210. By way of example, tracker 230 only needs metadata associated with the user's personal data to track the whereabouts of the user's personal data. Meanwhile, transaction manager 240 can manage each transaction based on the metadata involved in the transaction without transmitting any personal data of the user.

To facilitate a user to manager data privacy, transaction manager 240 may send information of the data distribution map to the user in response to a request from the user to review information in the data distribution map. After reviewing the information of the data distribution map, the user may want to change how his or her personal data are distributed online. As an example, the user may send a request to transaction manager 240 to update a selected item of user data at a selected service provider. For instance, the user may demand the selected service provider purge the selected item due to data privacy concerns. In this case, transaction manager 240 can send the request to the selected service provider to update the selected item at the selected service provider. Once the selected service provider confirms its compliance for executing the requested update, transaction manager 240 or tracker 230 can update the data distribution map with a new relationship between the metadata of the selected item and the selected service provider to reflect such update. For instance, once the selected item has been purged from the selected service provider, their existing connection in the data distribution map is to be removed, marked as obsolete, or saved as history.

In order to use DPSP 210 to manage personal data privacy, the user needs to establish a relationship with DPSP 210, e.g., open an account at DPSP 210. However, in some embodiments, a user may only need to permit a means for DPSP 210 to identify the user, such as based on a unique identifier, e.g., a cookie offered by DPSP 210, which can be stored in a user device (e.g., user device 112) of the user. Further, DPSP 210 will also establish an operational framework with various service providers. A service provider connected with DPSP 210 will be required to reconcile, monitor, and enforce privacy policy rules and protocols established at the operational framework, so that heterogeneous information systems with differing privacy rules can be interconnected with DPSP 210.

Figure 3:
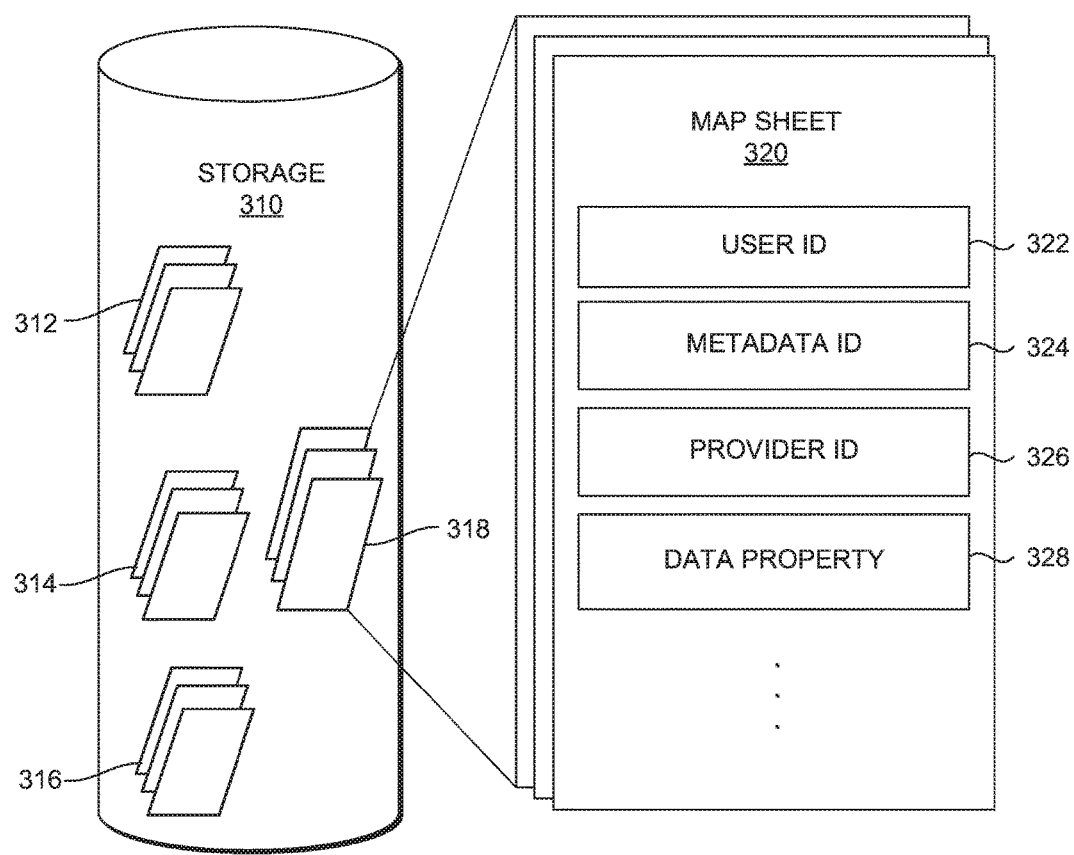
FIG. 3 is a block diagram depicting an example data distribution map suitable for implementing aspects of the present disclosure.

Referring now to FIG. 3, a block diagram is provided depicting an example data distribution map 318 suitable for implementing aspects of the present disclosure. Storage 310 is one embodiment of storage 250 of FIG. 2. In various embodiments, storage 310 may include user profiles 312, service provider profiles 314, metadata profiles 316, and data distribution map 318. Further, map sheet 320 is an individual map or chart either complete in itself or part of a series of data distribution maps 318.

In various embodiments, user profiles 312, service provider profiles 314, metadata profiles 316, and data distribution map 318 form a basis for the tracking mechanism to track the whereabouts of user data. User profiles 312, service provider profiles 314, metadata profiles 316, and data distribution map 318 may be implemented using any suitable data structure (e.g., lists, trees, etc.), any suitable database models (e.g., relational model, object model, etc.), or any suitable database management systems (e.g., Microsoft Access®, Microsoft SQL®, etc.).

User profiles 312 include information of users. Users may be identified by their user identifications, such as user ID 322. A user profile may include other personal information of the user, such as the user's email. Further, the user profile may also include various rules set up by the user regarding how the personal data of the user should be distributed among different service providers. By way of example, a user may set up a rule to share comprehensive financial information with the user's financial institutions, but set up another rule to share limited financial information with e-commerce vendors.

Service provider profiles 314 may include identifiable information of a service provider, the services provided by the service provider, the business nature of the service provider, etc. Further, a service provider profile may also include ratings of the service provider. Such ratings may be provided by a third party or based on the ratings provided by users. Such ratings of service providers may be used by users as a reference for the trustworthiness level of the service provider. In one embodiment, users may set up rules for determining whether and how they will share their personal information with a service provider based on such rating of the service provider. For instance, such ratings may range from 0 to 5. A user may set up a rule to automatically grant permission for any service provider with a rating of 5 to access the user's personal data. In various embodiments, an entry of a service provider in service provider profiles 314 has a provider ID to identify the entry.

Metadata profiles 316 include various metadata entries and their related information. By way of example, metadata profiles 316 may include an entry of "Last Name" as well as an entry of "Maiden Name." For the entry of "Last Name," metadata profiles 316 may include "Surname" as its equivalence. For the entry of "Maiden Name," metadata profiles 316 may include a valid time period with the maiden name. In various embodiments, an entry of metadata in metadata profiles 316 has a metadata ID to identify the entry.

Data distribution map 318 may be used to describe various metadata for user data and their relationship with various service providers, e.g., based on how the user data are distributed among the service providers. A map sheet may contain many metadata related to the personal data of the user. In one embodiment, one map sheet is used to describe only one metadata. By way of example, map sheet 320 includes user ID 322, metadata ID 324, provider ID 326, and data property 328. User ID 322 is used to denote a user having a user profile in storage 310, while provider ID 326 is used to denote a service provider having a service provider profile in storage 310. Similarly, metadata ID 324 is used to refer to a known metadata entry in metadata profile 316.

In map sheet 320, there could be many instances of data property 328 to denote different properties associated with the metadata. Continuing with the example of "Maiden Name," one instance of data property 328 may be used to describe the starting time of the maiden name used by the user, while another instance of data property 328 may be used to describe the ending time of the maiden name used by the user. Moreover, several instances of data property 328 may be used to denote attributes of the data stored by the service provider. As an example, several instances of data property 328 may be used to denote the creation date/time, the last modified date/time, and the expiration date/time of the user data at the service provider. Such information may be utilized by DPSP 210 of FIG. 2 in sweeping routines to monitor and maintain data integrity in various service providers. Further, several instances of data property 328 may be used to denote one or more rules set up by the user regarding how to share data with service providers. As an example, a user may set up a rule to prohibit the data of "Maiden Name" to be disclosed to any online stores as the maiden name normally is not required for online shopping transactions.

Figure 4:
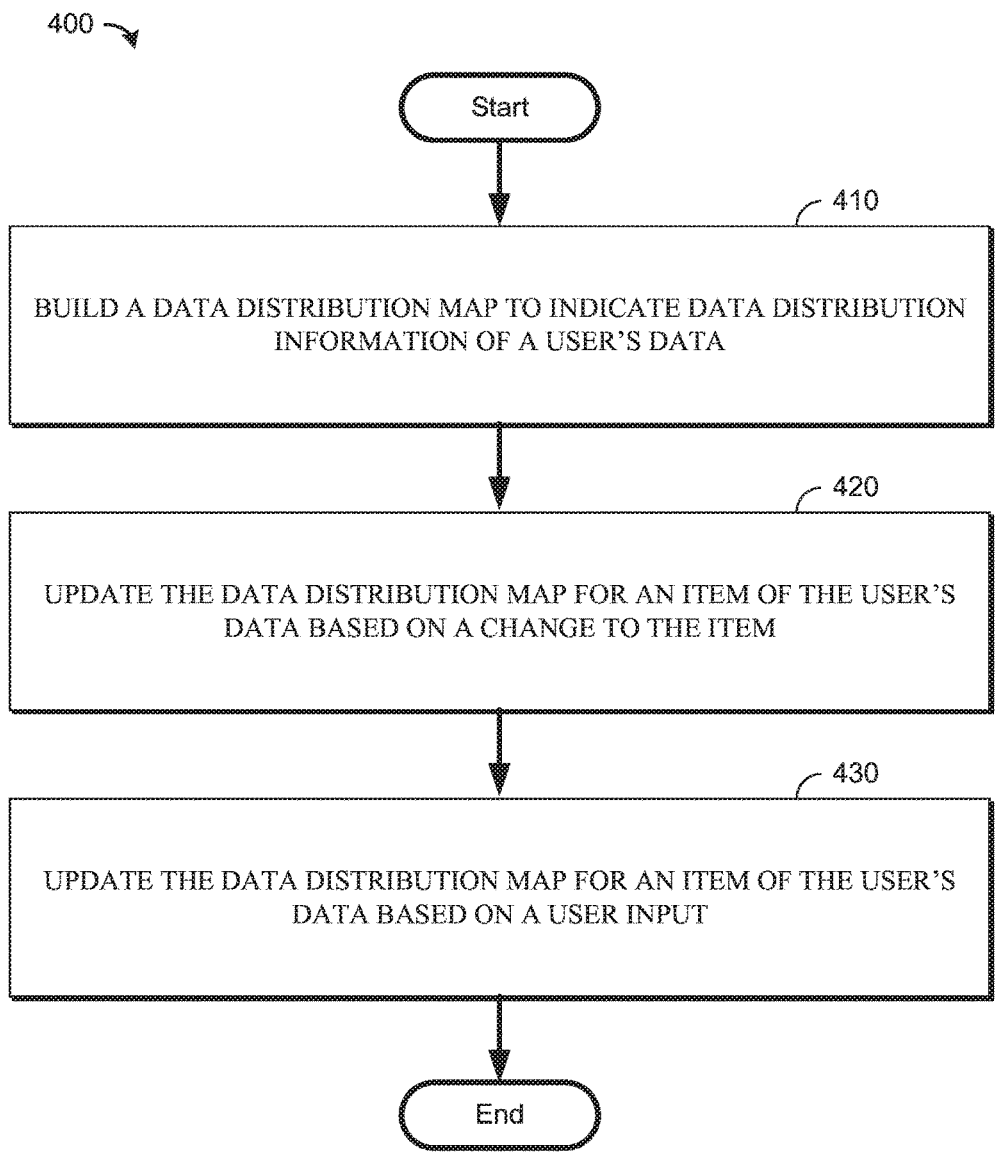
FIG. 4 is a flow diagram showing an exemplary process of updating a data distribution map for data privacy management, in accordance with an aspect of the technology described herein.

Turning now to FIG. 4, a flow diagram is illustrated showing an exemplary process 400 for updating a data distribution map for data privacy management, in accordance with an aspect of the technology described herein. Process 400 may be performed by one or more computing devices, such as DPSP 130 of FIG. 1 or DPSP 210 of FIG. 2. In various embodiments, the execution of process 400 may be facilitated by various service providers and various user devices.

At step 410, a data distribution map can be built, e.g., by tracker 230 of FIG. 2, to describe data distribution information of a user. In some embodiments, a DPSP may survey various service providers for the user data they have about a new user, e.g., after the new user registers with the DPSP. The DPSP may build a data distribution map for the new user based on the survey results. As an example, the DPSP can generate an indication of connection between metadata of a particular item of user data and a particular service provider when the particular service provider has the particular item. Then, the DPSP can populate the data distribution map with this indication of connection.

In some embodiments, the DPSP may receive the submission of a new item of user data of a user from a service provider or the user. In the case of receiving the actual user data, the DPSP may determine the metadata related to the new item first before populating the data distribution map with any new connections, e.g., a connection between the service provider provided actual user data and the metadata related to the new item. In the case of receiving only the metadata describing the new item, the DPSP may reconcile the submitted metadata terms with the standard metadata terms used in the DPSP first before populating the data distribution map with any new connections.

At step 420, the data distribution map can be updated due to changes to an item of user data. As an example, an item of user data may become corrupted or missing in a service provider due to various technical challenges. In this case, the data distribution map can be updated to reflect such incidents that happen to the user data. As another example, an item of user data may be forwarded from one service provider to another service provider. In this case, the data distribution map can be updated to reflect the new relationship between the forwarded item and the recipient of the item. As yet another example, an item of user data may become obsolete for various reasons (e.g., a credit card number may become obsolete after the expiration date of the card). In this case, the data distribution map can be updated to mark the item as obsolete and further to purge the item from its keepers.

At step 430, the data distribution map can be updated in response to a user input. As an example, the user may directly submit a new item of user data (or metadata describing the new item thereof) to the DPSP. Subsequently, the DPSP may update the data distribution map based on the new item of user data. As another example, the user may send a request to the DPSP to modify an existing map sheet, such as setting up or altering a rule for data sharing, purging user data from a selected service provider, or notifying various service providers for a user data changing event (e.g., the user may have a new address due to relocation). Conveniently, the user may only need to notify the DPSP once for an intended change without contacting each and every service provider that may be affected by such change.

Figure 5:
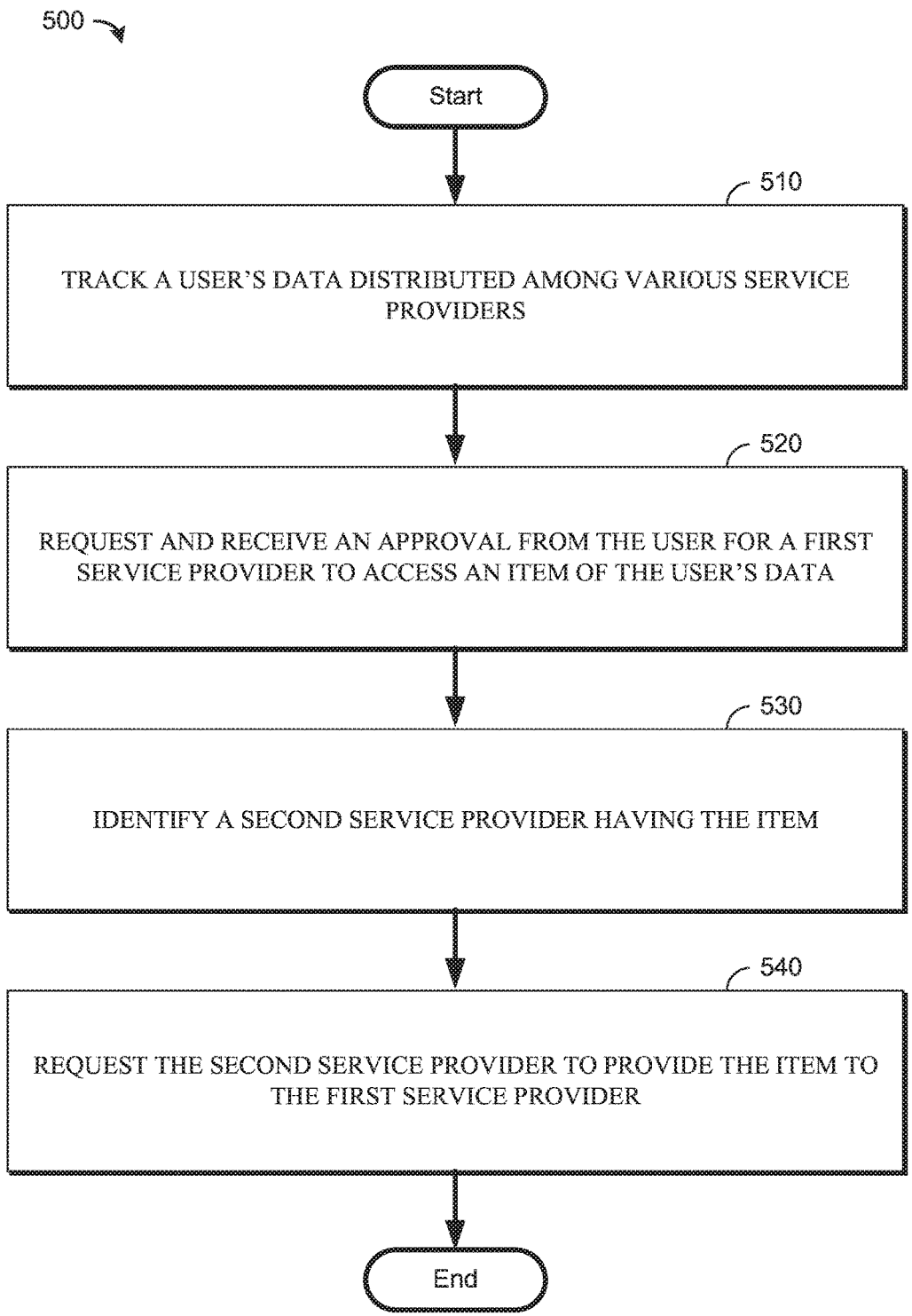
FIG. 5 is a flow diagram showing an exemplary process of data privacy management from the perspective of a provider for data privacy service, in accordance with an aspect of the technology described herein.

Turning now to FIG. 5, a flow diagram is illustrated showing an exemplary process 500 for data privacy management from the perspective of a DPSP, particularly related to forwarding user data from one service provider to another, in accordance with an aspect of the technology described herein. Process 500 may be performed by one or more computing devices, such as DPSP 130 of FIG. 1 or DPSP 210 of FIG. 2. In various embodiments, the execution of process 500 may be facilitated by various service providers and various user devices.

At step 510, a user's data distributed among various service providers may be tracked, e.g., by tracker 230 of FIG. 2. In some embodiments, a data distribution map may be used by tracker 230 to monitor the whereabouts of the user's data as well as various properties associated with the user data. Meanwhile, the data distribution map may be updated based on changes to the user's data or based on an input from the user. Therefore, the data distribution map may accurately reflect the real-time situation of how the user's data are distributed among service providers.

At step 520, the DPSP may request and receive an approval from the user for a first service provider to access an item of the user's data. After the first service provider and the user both have established a relationship with the DPSP, the first service provider is no longer limited to requesting user data directly from the user. The first service provider may now request user data from the DPSP instead.

As an example, during an online purchase from the first service provider, which has no existing relationship with the user, the user is normally required to input the payment information, such as a credit card, in order to complete the transaction. However, with the framework as described in connection with FIG. 1, this process of inputting the payment information can be made transparent to the user. Namely, the first service provider now can submit a request for the payment information to the DPSP. Subsequently, the DPSP may explicitly solicit the user to approve the specific access request from the first service provider.

Alternatively, the DPSP may respond to such request based on an existing rule set up by the user, such as to automatically provide the last used payment information in the present online purchase. In one embodiment, a user device may send a special token, e.g., issued by the DPSP for denoting a specific rule assigned by the user, to the first service provider. In turn, the first service provider may forward the special token to the DPSP. In this case, the DPSP may respond to that access request from the service provider based on this special token, which implicitly contains an approval from the user, e.g., for the first service provider to access the user's payment information.

At step 530, a second service provider may be identified as having the requested item, e.g., by transaction manager 240 of FIG. 2. Often, there are more than one service providers that may have the requested item. The information of the service providers that have the requested item may be obtained from, e.g., data distribution map 318. In one embodiment, an inverted index based on metadata of the user's data may be created to facilitate a fast search for any metadata. As an example, a search for "Default Shipping Address" for the user may return a list of service providers that have the default shipping address of the user.

In some embodiments, the DPSP may further identify a selected service provider, e.g., the second service provider, from the set of service providers that has the requested item. The second service provider may be selected based on its trustworthiness, e.g., based on its rating. The second service provider may be selected if it is the most recent service provider that successfully provided the requested item. The second service provider may be selected based on other rationales, such as for load-balancing of data forwarding requests to various service providers, whether the two service providers are located in a common jurisdiction for legal compliance, etc. In some embodiments, the second service provider may be manually selected by the user.

At step 540, the DPSP can request the second service provider to provide the requested item to the first service provider. In some embodiments, the DPSP may provide an acknowledgment to the first service provider regarding the approval from the user for the first service provider to access the requested item. In some embodiments, the DPSP may include such approval and a universal resource locator (URL) of the first service provider in a request to the second service provider, so that the second service provider may forward the requested item to the first service provider identified by the URL. In some embodiments, the second service provider may verify such approval with the DPSP or the user.

Figure 6:
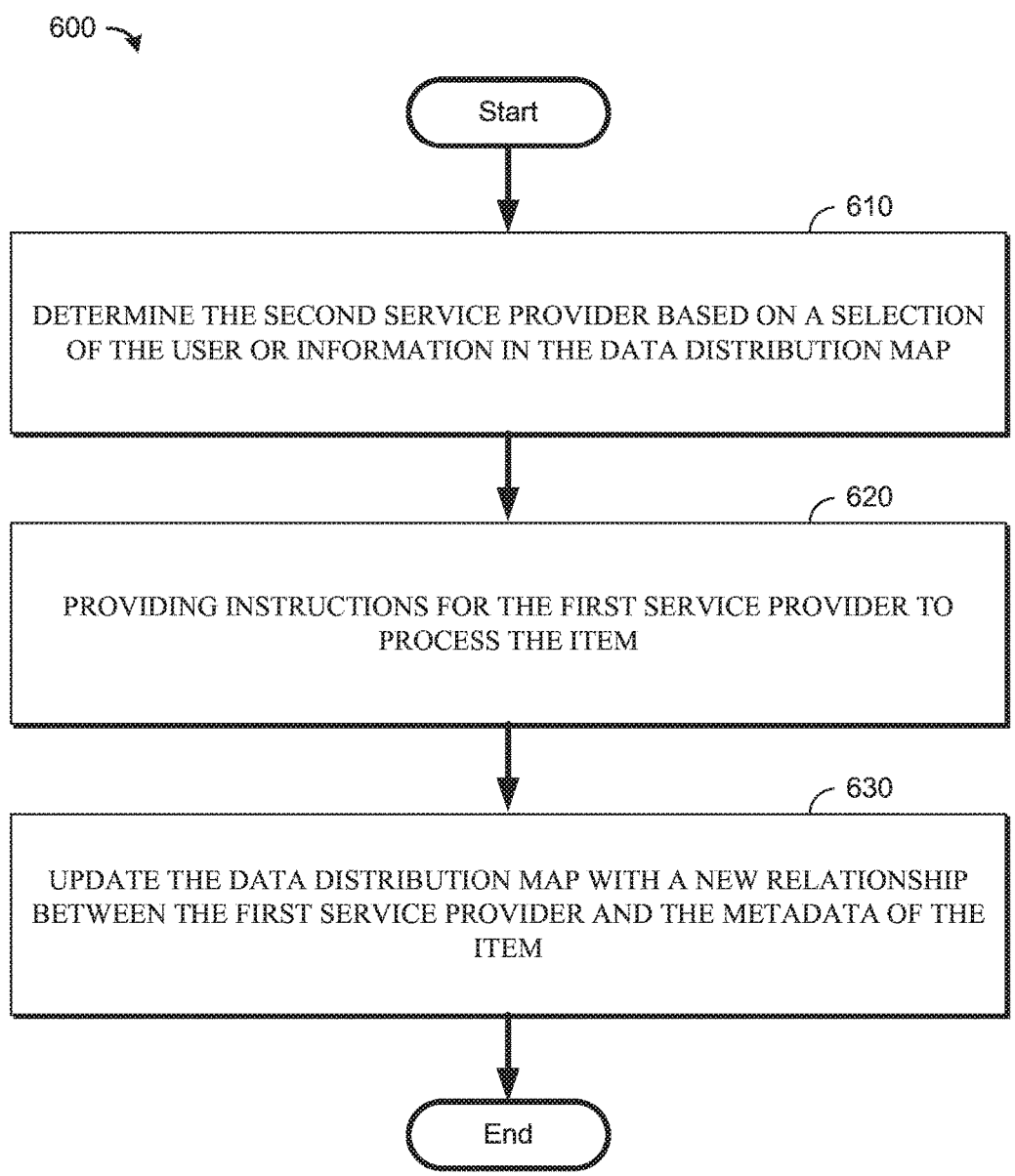
FIG. 6 is a flow diagram showing another exemplary process of data privacy management from the perspective of a provider for data privacy service, in accordance with an aspect of the technology described herein.

Turning now to FIG. 6, a flow diagram is illustrated showing another exemplary process 600 for data privacy management from the perspective of a DPSP, particularly related to forwarding user data from one service provider to another. Process 600 may be performed by one or more computing devices, such as DPSP 130 of FIG. 1 or DPSP 210 of FIG. 2. In various embodiments, the execution of process 600 may be facilitated by various service providers and various user devices.

At step 610, the second service provider having the requested item may be determined, e.g., by transaction manager 240 of FIG. 2, based on a selection of the user or information in the data distribution map, e.g., data distribution map 318. In one embodiment, the DPSP may send a list of service providers having the requested item to the user, and allow the user to select a service provider from the list. The user may make such determination based on, e.g., the user's prior experience with those service providers. In another embodiment, the DPSP may select from the list of service providers who have the requested item based on, e.g., the ratings of these service providers, the locations of these service providers, or other suitable criteria.

At step 620, a set of instructions may be provided to the first service provider, e.g., by transaction manager 240 of FIG. 2, to process the requested item of user data that is received by the first service provider. Such instructions may be created from the information contained in the data distribution map. As an example, one instance of the data property 328 may specify whether the service provider receiving the requested item may store the item locally after the initial necessary time period for the service provider to complete a transaction for the user. In this case, the DPSP may provide an indication of permission or an indication of prohibition for the first service provider to store the item after the approved initial access period. As another example, another instance of the data property 328 may specify the duration for a service provider to store the requested item locally. Therefore, the DPSP may also provide an indication of duration for the first service provider to store the item locally. Other instructions may be similarly generated based on the information contained in the data distribution map.

In other embodiments, such instructions may be created based on a user input. By way of example, when the user approves the first service provider to access the requested item, the user may additionally indicate related requirements for the first service provider to process the item of user data. As an example, the user may specify whether the first service provider may store the requested item locally, or further, a duration for the first service provider to store the requested item locally. In one embodiment, the user may specify a default policy in the absence of specific overriding instructions. For instance, the default policy may be for the service provider to store the requested item locally until such access is revoked by the user in the future.

In this data sharing process, heterogeneous information systems (e.g., user devices, service providers, DPSP, etc.) need to communicate such instructions. In various embodiments, the DPSP may coordinate a standard for communicating such data privacy practices. By way of example, the DPSP may opt to use the Platform for Privacy Preferences (P3P), the Extensible Access Control Markup Language (XACML), the Enterprise Privacy Authorization Language (EPAL), Web Service Privacy (WS-Privacy), or any suitable communication protocols or languages for data privacy management. Alternatively, the DPSP may promulgate or enforce its own protocols or languages for data privacy management.

At step 630, a new relationship between the first service provider and the metadata of the requested item may be updated in the data distribution map, e.g., after the first service provider provides a confirmation to the DPSP for receiving the requested item. In this way, the DPSP may maintain an up-to-date data distribution map. In one embodiment, the DPSP may create a new map sheet, similar to map sheet 320, to manifest the new relationship between the first service provider and the requested item.

Figure 7:
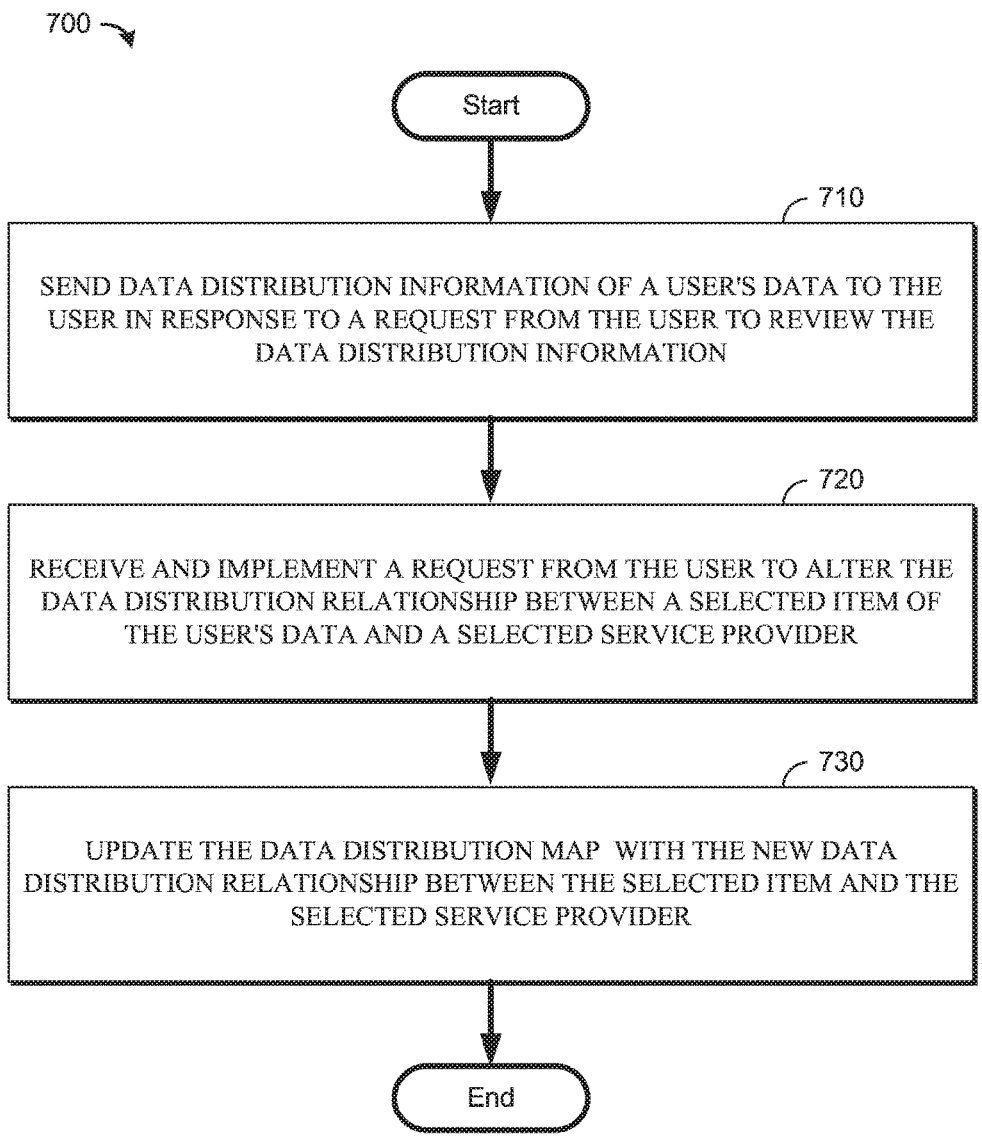
FIG. 7 is a flow diagram showing an exemplary process of data privacy management by a user, in accordance with an aspect of the technology described herein.

Turning now to FIG. 7, a flow diagram is illustrated showing an exemplary process 700 for data privacy management by a user. Process 700 may be performed by one or more computing devices, such as DPSP 130 of FIG. 1 or DPSP 210 of FIG. 2. In various embodiments, the execution of process 700 may be facilitated by various service providers and various user devices.

At step 710, data distribution information of a user's data may be sent, e.g., by transaction manager 240 of FIG. 2, to the user, e.g., in response to a request from the user to review such data distribution information. When a user needs to review how the user's data are distributed among various service providers, the user may simply send an inquiry to the DPSP because the DPSP now has the data distribution information for the user, e.g., contained in data distribution map 318. The presentation of such information may vary in different embodiments, e.g., depending on the specific client device used by the user or a specific inquiry sent by the user. By way of example, only the information related to a specific metadata inquired by the user may be sent back to the user in some embodiments.

At step 720, the DPSP may receive and implement a request from the user to alter the data distribution relationship between a selected item of the user's data and a selected service provider. Based on the information of the data distribution map, the user may decide to change some existing entries in the data distribution map or even to create a new entry in the data distribution map. In this case, the user may send such requests to the DPSP, and the DPSP may implement such changes requested by the user. As an example, the user may decide to preauthorize a service provider proactively in anticipation of future transactions with the service provider. For instance, the user may anticipate purchasing a new generation Surface® product from the Microsoft Store® during an upcoming promotion event. To expedite the purchasing process at the promotion event, the user may authorize the Microsoft Store® to access the user's shipping address, a payment method, or even the user's preferences for such Surface® product based on the user's prior purchases. In this case, the DPSP can either prepare a new map sheet for the Microsoft Store® so that the access request from the Microsoft Store® in the future may be handled expediently. Alternatively, the DPSP can directly issue a data forwarding order to an existing service provider to forward such data to the Microsoft Store® even before the Microsoft Store® sends such access request.

At step 730, the new data distribution relationship between the selected item and the selected service provider may be updated in the data distribution map, e.g., by transaction manager 240 of FIG. 2. In some embodiments, a new map sheet, like map sheet 320, may be created to denote the new relationship between metadata of the selected item and the selected service provider. In some embodiments, an existing map sheet may be updated to reflect the new relationship between metadata of the selected item and the selected service provider. Therefore, the DPSP can maintain an accurate data distribution map.

Figure 8:
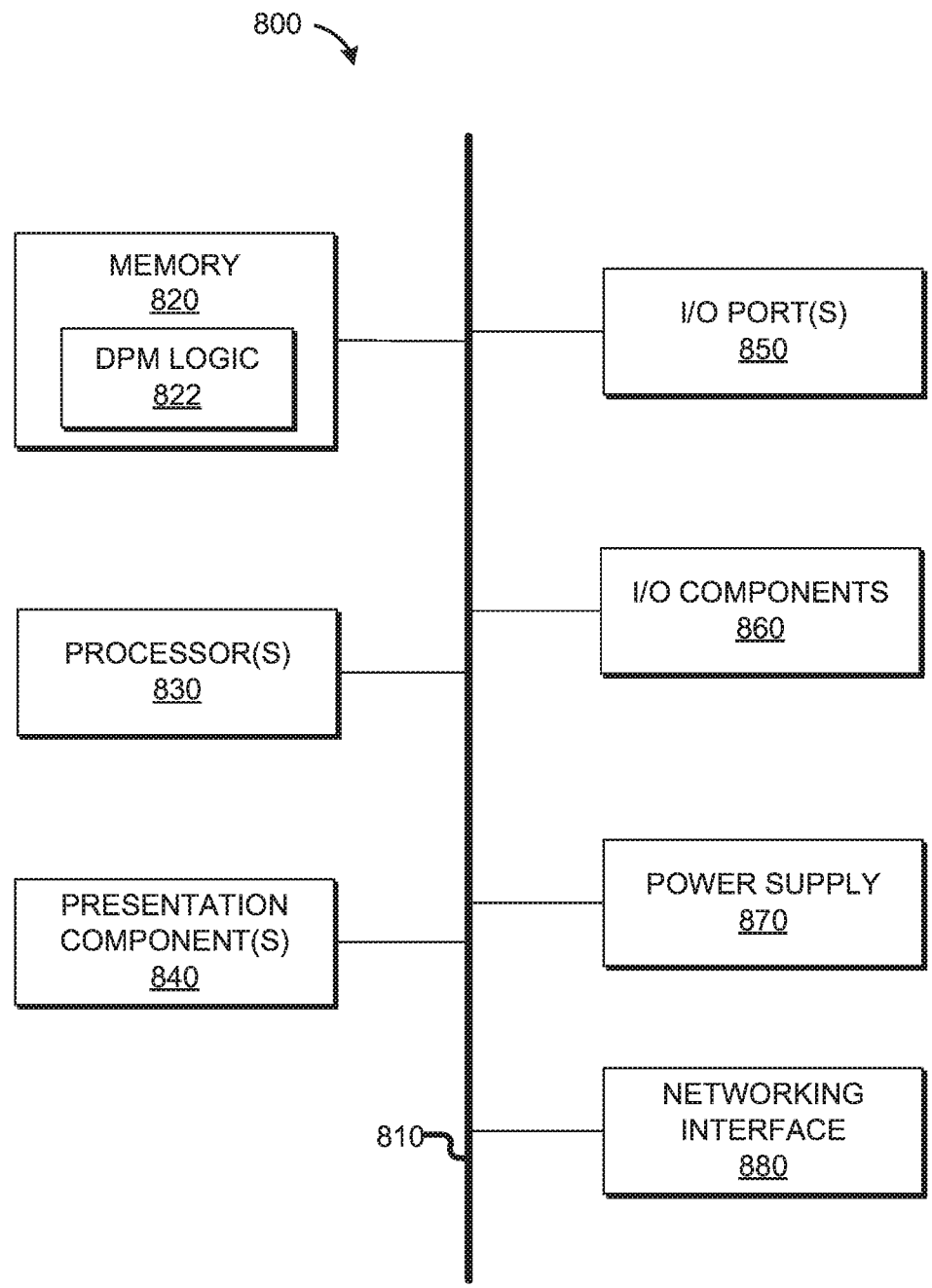
FIG. 8 is a block diagram of an exemplary computing environment suitable for use in implementing aspects of the technology described herein.

Referring to the drawings in general, and initially to FIG. 8 in particular, an exemplary operating environment for implementing aspects of the technology described herein is shown and designated generally as computing device 800. Computing device 800 is but one example of a suitable computing environment and is not intended to suggest any limitation as to the scope of use of the technology described herein. Neither should the computing device 800 be interpreted as having any dependency or requirement relating to any one or combination of components illustrated.

The technology described herein may be described in the general context of computer code or machine-useable instructions, including computer-executable instructions such as program components, being executed by a computer or other machine. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are connected through a communications network.

With continued reference to FIG. 8, computing device 800 includes a bus 810 that directly or indirectly couples the following devices: memory 820, one or more processors 830, one or more presentation components 840, input/output (I/O) ports 850, I/O components 860, and an illustrative power supply 870. Bus 810 represents what may be one or more busses (such as an address bus, data bus, or a combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 820 includes computer storage media in the form of volatile and/or nonvolatile memory. The memory 820 may be removable, non-removable, or a combination thereof. Exemplary memory includes solid-state memory, hard drives, optical-disc drives, etc. Computing device 800 includes one or more processors 830 that read data from various entities such as bus 810, memory 820, or I/O components 860. Presentation component(s) 840 present data indications to a user or other device. Exemplary presentation components 840 include a display device, speaker, printing component, vibrating component, etc. I/O ports 850 allow computing device 800 to be logically coupled to other devices, including I/O components 860, some of which may be built in.

In various embodiments, memory 820 includes, in particular, temporal and persistent copies of data privacy management logic 822. Data privacy management logic 822 includes instructions that, when executed by one or more processors 830, result in computing device 800 performing data privacy management functions, such as, but not limited to, process 400, 500, 600, or 700. In various embodiments, data privacy management logic 822 includes instructions that, when executed by processor(s) 830, result in computing device 800 performing various functions associated with, but not limited to, networking interface 220, tracker 230, transaction manager 240, or storage 250 in connection with FIG. 2.

In some embodiments, one or more processors 830 may be packaged together with data privacy management logic 822. In some embodiments, one or more processors 830 may be packaged together with data privacy management logic 822 to form a System in Package (SiP). In some embodiments, one or more processors 830 can be integrated on the same die with data privacy management logic 822. In some embodiments, processors 830 can be integrated on the same die with data privacy management logic 822 to form a System on Chip (SoC).

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 830 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

Computing device 800 may include networking interface 880. The networking interface 880 includes a network interface controller (NIC) that transmits and receives data. The networking interface 880 may use wired technologies (e.g., coaxial cable, twisted pair, optical fiber, etc.) or wireless technologies (e.g., terrestrial microwave, communications satellites, cellular, radio and spread spectrum technologies, etc.). Particularly, the networking interface 880 may include a wireless terminal adapted to receive communications and media over various wireless networks. Computing device 800 may communicate via wireless protocols, such as Code Division Multiple Access (CDMA), Global System for Mobiles (GSM), or Time Division Multiple Access (TDMA), as well as others, to communicate with other devices via the networking interface 880. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. A computer-implemented method for providing data privacy management, the method comprising:
   tracking whereabouts of a plurality of data of a user, the plurality of data being provided to one or more service providers;
   receiving an approval from the user for a first service provider to access a datum of the plurality of data of the user; and
   based on the whereabouts of the plurality of data of the user and the approval from the user, requesting the datum from a second service provider among the one or more service providers.

2. The method of claim 1, further comprising:
   receiving a request from the first service provider to access the datum; and
   soliciting the approval from the user for the first service provider to access the datum.

3. The method of claim 1, wherein the tracking comprises establishing a relationship between the first service provider and the datum in a data structure for data distribution.

4. The method of claim 1, further comprising:
   providing a user interface for the user to review a relationship between the first service provider and the datum.

5. The method of claim 4, further comprising:
   enabling the user to modify the relationship between the first service provider and the datum.

6. The method of claim 1, further comprising:
   generating inverted indexes based on metadata of the datum; and
   identifying the second service provider based on the inverted indexes.

7. The method of claim 1, further comprising:
   generating a data distribution map to connect metadata describing the datum and a plurality of service providers having the datum; and
   identifying the second service provider based on the data distribution map.

8. The method of claim 1, further comprising:
   based on the second service provider being located in a common jurisdiction as the first service provider, selecting the second service provider from a plurality of service providers having the datum.

9. The method of claim 1, further comprising:
   based on a history of the second service provider for providing at least one datum of the plurality of data of the user, selecting the second service provider from a plurality of service providers having the datum.

10. One or more computer storage devices comprising computer-implemented instructions that, when used by one or more computing devices, cause the one or more computing devices to perform operations comprising:
    tracking relationships between a plurality of service providers and a datum associated with a user, wherein the relationships include information of whereabouts of the datum among the plurality of service providers;
    receiving an authentication for a first service provider to access the datum; and
    based on the relationships and the authentication, causing a second service provider from the plurality of service providers to provide the datum to the first service provider.

11. The one or more computer storage devices of claim 10, the operations further comprising:
    causing the first service provider to access the datum without a direct input of the datum from the user.

12. The one or more computer storage devices of claim 10, wherein the tracking comprises tracking the relationships based on metadata describing the datum without accessing the datum.

13. The one or more computer storage devices of claim 10, the operations further comprising:
    identifying the second service provider based on metadata describing the datum.

14. The one or more computer storage devices of claim 10, the operations further comprising:
    generating a data distribution map to connect metadata describing the datum and the plurality of service providers having the datum; and
    identifying the second service provider based on the data distribution map.

15. The one or more computer storage devices of claim 14, the operations further comprising:
    updating the data distribution map with a new connection between the datum and the first service provider.

16. The one or more computer storage devices of claim 14, the operations further comprising:
    causing the user to control online dataflow of the datum based on the data distribution map.

17. A computer-implemented system for providing data privacy management, the system comprising:
    means for tracking whereabouts of a datum associated with a user among a plurality of service providers;
    means for authenticating a first service provider to access the datum; and
    means for enabling the first service provider to retrieve the datum from a second service provider without a direct input of the datum to the first service provider by the user.

18. The system of claim 17, further comprising:
    means for the user to control online dataflow of the datum from the second service provider to the first service provider.

19. The system of claim 17, further comprising:
    means for generating a data distribution map with metadata describing the whereabouts of the datum; and
    means for identifying the second service provider based on the data distribution map.

20. The system of claim 19, further comprising:
    means for the user to review information of the data distribution map.

* * * * *